(12) United States Patent
Monfarednasab et al.

(10) Patent No.: US 12,586,243 B2
(45) Date of Patent: Mar. 24, 2026

(54) MONITORING APPARATUS AND METHOD FOR PREVENTING PRESSURE INJURIES

(71) Applicants: Marjan Monfarednasab, Bedford, MA (US); Shahab Bayani Ahangar, Bedford, MA (US); Gregory G Collier, Sudbury, MA (US)

(72) Inventors: Marjan Monfarednasab, Bedford, MA (US); Shahab Bayani Ahangar, Bedford, MA (US); Gregory G Collier, Sudbury, MA (US)

( * ) Notice: Subject to any disclaimer, the term of this patent is extended or adjusted under 35 U.S.C. 154(b) by 0 days.

(21) Appl. No.: 19/323,387

(22) Filed: Sep. 9, 2025

(65) Prior Publication Data

US 2026/0073560 A1     Mar. 12, 2026

Related U.S. Application Data

(60) Provisional application No. 63/693,300, filed on Sep. 11, 2024.

(51) Int. Cl.
| | |
|---|---|
| *G06K 9/00* | (2022.01) |
| *G06T 7/00* | (2017.01) |
| *G06T 7/10* | (2017.01) |
| *G06T 7/73* | (2017.01) |

(52) U.S. Cl.
CPC ............. *G06T 7/75* (2017.01); *G06T 7/0012* (2013.01); *G06T 7/10* (2017.01); *G06T 2207/10048* (2013.01); *G06T 2207/20081* (2013.01); *G06T 2207/20084* (2013.01); *G06T 2207/30196* (2013.01)

(58) Field of Classification Search
CPC ........... G06T 7/75; G06T 7/0012; G06T 7/10; G06T 2207/10048; G06T 2207/20081; G06T 2207/20084; G06T 2207/30196
See application file for complete search history.

(56) References Cited

U.S. PATENT DOCUMENTS

| | | | |
|---|---|---|---|
| 9,220,455 | B2 | 12/2015 | Sarrafzadeh |
| 9,326,723 | B2 | 5/2016 | Petersen |
| 10,269,112 | B2 | 4/2019 | Spahn |
| 10,492,734 | B2 | 12/2019 | Ferber |
| 11,642,075 | B2 | 5/2023 | Burns |
| 12,217,862 | B2 | 2/2025 | Perlman |
| 12,290,483 | B2 | 5/2025 | Mayer |

(Continued)

FOREIGN PATENT DOCUMENTS

EP        4429204 A2 *  9/2024  .......... H04W 12/069

OTHER PUBLICATIONS

Camera fusion for real-time temperature monitoring of neonates using deep learning, Simon Lyra et al., Springer, May 2022, pp. 1787-1800 (Year: 2022).*

(Continued)

*Primary Examiner* — Jayesh A Patel
(74) *Attorney, Agent, or Firm* — Lindsey Peck; Rachel Mobley; NCCU SOL IP Clinic

(57) ABSTRACT

The present invention is directed to a monitoring apparatus and method for preventing pressure injuries. More specifically, an apparatus and method that is portable, multifunctional, and easy to use, capable of passive monitoring, AI triage monitoring, and EMR integration that can detect deep tissue injuries, falls, and/or bed wetness, using an equitable approach to detection.

20 Claims, 9 Drawing Sheets

(56) References Cited

U.S. PATENT DOCUMENTS

| | | | | |
|---|---|---|---|---|
| 12,357,239 | B2 | 7/2025 | Main | |
| 2018/0350073 | A1* | 12/2018 | Shokri | A61B 5/1072 |
| 2019/0307405 | A1* | 10/2019 | Terry | G16H 10/60 |
| 2019/0336085 | A1* | 11/2019 | Kayser | A61B 5/202 |
| 2020/0303081 | A1* | 9/2020 | Przekwas | G16H 15/00 |
| 2022/0051437 | A1* | 2/2022 | Ostadabbas | G06T 7/80 |
| 2022/0386898 | A1* | 12/2022 | Ostadabbas | G06V 20/52 |
| 2023/0024672 | A1* | 1/2023 | Bonutti | G06V 40/168 |
| 2023/0297810 | A1* | 9/2023 | Khinvasara | G06N 3/088 |
| | | | | 706/16 |
| 2024/0108524 | A1* | 4/2024 | Khair | A61B 5/7267 |
| 2024/0257392 | A1* | 8/2024 | Hazeli | G08B 21/043 |
| 2025/0148597 | A1* | 5/2025 | Putha | G06V 10/764 |

OTHER PUBLICATIONS

Modeling Humans at Rest With Applications to Robot Assistance, Henry M. Clever, Dec. 2021, pp. 1-154 ( Year: 2021).*

An Edge Computing and Ambient Data Capture System for Clinical and Home Environme, Pradyumna Byappanahalli Suresha et al., MDPI, 2022, pp. 1-25 (Year: 2022).*

Camera fusion for real-time temperature monitoring of neonates using deep learning, Simon Lyra et al., Springer, 2022, pp. 1787-1800 (Year: 2022).*

Modeling Humans at Rest With Applications to Robot Assistance, Henry M. Clever, Dec. 2021, pp. Vi-153 (Year: 2021).*

An Edge Computing and Ambient Data Capture System for Clinical and Home Environments, Pradyumna Byappanahalli Suresha et al., MDPI, 2022, pp. 1-25 (Year: 2022).*

Improving Timeliness of Nursing Documentation, Anthony S. Morgan , ARCH, Aug. 2023, pp. 1-47 (Year: 2023).*

Liu, S., Huang, X., Fu, N., Li, C., Su, Z., & Ostadabbas, S. (2022). Simultaneously-collected multimodal lying pose dataset: Enabling in-bed human pose monitoring. IEEE Transactions on Pattern Analysis and Machine Intelligence, 45 (1), 1106-1118.

Liu, S., Huang, X., Fu, N., Li, C., Su, Z., & Ostadabbas, S. (2020). Simultaneously-collected multimodal lying pose dataset: Towards in-bed human pose monitoring under adverse vision conditions. arXiv preprint arXiv:2008.08735.

Cai, F., Jiang, X., Hou, X., Wang, D., Wang, Y., Deng, H., . . . & Li, X. (2021). Application of infrared thermography in the early warning of pressure injury: a prospective observational study. Journal of clinical nursing, 30(3-4), 559-571.

Kanazawa, T., Kitamura, A., Nakagami, G., Goto, T., Miyagaki, T., Hayashi, A., . . . & Sanada, H. (2016). Lower temperature at the wound edge detected by thermography predicts undermining development in pressure ulcers: a pilot study. International Wound Journal, 13(4), 454-460.

Koerner, S., Adams, D., Harper, S. L., Black, J. M., & Langemo, D. K. (2019). Use of thermal imaging to identify deep-tissue pressure injury on admission reduces clinical and financial burdens of hospital-acquired pressure injuries. Advances in skin & wound care, 32(7), 312-320.

Mayrovitz, H. N., Spagna, P. E., & Taylor, M. C. (2018). Sacral skin temperature assessed by thermal imaging: role of patient vascular attributes. Journal of Wound Ostomy & Continence Nursing, 45(1), 17-21.

Lin, L., Zhuang, D., Guo, H., Zheng, M., Zhu, Q., Xu, Y., . . . & Cai, F. (2025). Application of infrared thermography for predicting pressure injury healing: A prospective study. Journal of Tissue Viability, 34(2), 100857.

Jiang, X., Wang, Y., Wang, Y., Zhou, M., Huang, P., Yang, Y., . . . & Cai, F. (2022). Application of an infrared thermography-based model to detect pressure injuries: a prospective cohort study. British Journal of Dermatology, 187 (4), 571-579.

Chao, Q., Pei, J., Wei, Y., Yang, Z., Wang, X., Du, L., & Han, L. (2025). Evaluation methods of pressure injury stages: A systematic review and meta-analysis. Journal of Tissue Viability, 100894.

Jiang, X., Hou, X., Dong, N., Deng, H., Wang, Y., Ling, X., . . . & Cai, F. (2020). Skin temperature and vascular attributes as early warning signs of pressure injury. Journal of tissue viability, 29(4), 258-263.

* cited by examiner

FIG. 1 (Cont.)

Risk Assessment Engine 40

Pressure Injury Risk Calculator 41

Mobility Risk Calculator 42

Confidence Assessment 43

Intelligent Decision Matrix 50

Composite Risk Score 51

Urgency Assessment 52

Trend Analysis 53

Decision Support Output 60

Pressure Injury 61

Posture Change 62

Other Alerts 63

Data Security & Privacy Management 70

Access Control 71

Data Retention 72

Hippa Compliance Cloud 73

A

MONITORING APPARATUS AND METHOD FOR PREVENTING PRESSURE INJURIES

CROSS-REFERENCE TO RELATED APPLICATIONS

This application claims the benefit of U.S. Provisional Application No. 63/693,300 filed on Sep. 11, 2024, which is hereby incorporated in its entirety.

FIELD OF THE INVENTION

The present invention is directed to a monitoring apparatus and method for preventing pressure injuries. More specifically, an apparatus and method that is portable, multi-functional, and easy to use, capable of passive monitoring, AI triage monitoring, and EMR integration that can detect deep tissue injuries, falls, and/or bed wetness, using an equitable approach to detection.

BACKGROUND OF THE INVENTION

Globally, the prevalence of hospital-acquired pressure injuries (HAPI) among hospitalized patients is 8.4%. In the United States, over 2.5 million people develop pressure injuries annually. In nursing homes, more than one in ten residents suffers from pressure injuries.

Pressure injuries lead to longer hospital stays, increased morbidity and mortality, and serious infections and complications. They can significantly impact the quality of life, causing patients to suffer and experience severe pain. In severe cases, pressure injuries can lead to limb amputation and even death, particularly among the elderly and those with limited mobility.

In the United States, an estimated $26.8 billion is spent on treatment of reported pressure injuries annually. The cost of treating an individual can range from $20,900 to $151,700. Medicare estimates that each pressure injury adds approximately $43,180 to the cost of a hospital stay.

Elderly individuals in nursing homes or long-term care facilities have a high risk of developing pressure injuries with prevalence rates ranging from 8% to 28% depending on the care setting. Hospitalized patients, particularly those with conditions requiring extended bed rest, such as cancer treatment or severe illness recovery, are also at significant risk.

Current methods for detecting pressure injuries to patients include visual skin inspection and risk scoring, mattress-based sensor systems, thermal imaging cameras, wearable sensors, and sub-epidermal moisture (SEM) scanners. Tools like the Braden scale are widely used to assess pressure injury risk based on subjective clinical observation. For example, physically observing skin appearance, mobility, and moisture. These tools are prone to error, especially on patients with darker skin tones, and often fail to catch deep tissue injuries early enough.

Mattress-based sensor systems monitor pressure distribution but do not track tissue health or temperature changes. These systems are often expensive, hard to retrofit, and are not portable. Thermal imaging cameras are handheld systems that can be used by clinicians for spot-checks. These devices require trained use and do not provide continuous monitoring or automated alerts. In addition, these checks are often limited to once per twelve-hour shift.

Wearable sensors are used in some hospitals. They typically track moisture or movement (e.g., stick-on sensors) but suffer from limited lifespan, invasiveness, and can be uncomfortable for patients. Lastly, SEM scanners are capable of detecting early-stage pressure injuries by measuring changes in interstitial fluid beneath the skin. However, this is a single-point, handheld, contact-based device. While it can detect pre-symptomatic tissue inflammation it requires trained clinician operation. In addition, SEM scanners do not monitor posture or patient movement, cannot continuously track or offer triage automation, and is not suitable for passive monitoring or home use.

Therefore, there exists a need for an apparatus and method that is portable, multi-functional, and easy to use, capable of passive monitoring, AI triage monitoring, and EMR integration that can detect deep tissue injuries, falls, and/or bed wetness, using an equitable approach to detection.

SUMMARY OF THE INVENTION

The present invention is directed to a monitoring apparatus and method for preventing pressure injuries. More specifically, an apparatus and method that is portable, multi-functional, and easy to use, capable of passive monitoring, AI triage monitoring, and EMR integration that can detect deep tissue injuries, falls, and/or bed wetness, using an equitable approach to detection.

In an exemplary embodiment, a monitoring apparatus for preventing pressure injuries comprises: a plurality of hardware components, wherein the plurality of hardware components comprises: a thermal camera, a visible camera, an integrated housing unit, integrated electronics, a privacy control section, and a processing unit; a multimodal analysis system, wherein the multimodal analysis system comprises: a pose estimation model, a body part segmentation model, and a pressure injury assessment model; a multi-parameter input data section, wherein the multi-parameter input data section comprises user-added patient data relating to patient, environment, movement, and rotation-time; a risk assessment engine, wherein the risk assessment engine comprises a pressure injury risk calculator, a mobility risk calculator, and a confidence assessment; an intelligent decision matrix, wherein the intelligent decision matrix comprises a composite risk score, an urgency assessment, and a trend analysis; a decision support output; and a data security and privacy management control section wherein the data security and privacy management control section comprises an access control, a data retention section, and a HIPPA compliant cloud.

In an alternate embodiment, the thermal camera further comprises a long-wave infrared sensor and the visible camera comprises a near-infrared camera.

In yet another embodiment, the thermal camera further comprises a long-wave infrared sensor and the visible camera comprises an RGB camera.

In another embodiment, the integrated housing comprises a lamp, a handheld module, or a clip-on module. In yet another embodiment, the integrated housing a wall-mounted unit, a ceiling-mounted unit, or a mobile-cart unit.

In one embodiment, the decision support output comprises notification data relating to pressure injury, posture change, or any other necessary alert required by user.

An exemplary method for monitoring a patient using the multimodal analysis system comprises the following steps for the pose estimation model, the body part segmentation model, and the pressure injuries assessment model: (1) the pose estimation model comprises the following steps: beginning with a multimodal pose estimation dataset; pre-processing the multimodal pose estimation dataset; sending the processed multimodal pose estimation dataset to a training dataset module and to an evaluation dataset module; sending training dataset to a machine learning model; evaluating performance of the machine learning model using the evaluation dataset and providing at least two outcomes: sending feedback derived from the evaluation dataset into the machine learning model for further tuning based on the evaluation results indicating suboptimal performance, or resulting in a fine-tuned machine learning model based on the evaluation results meeting predefined performance criteria; feeding pre-processed RGB or NIR images into the fine-tuned machine learning model; producing a first output, comprising posture information and pose joint coordinates; and (2) wherein the body part segmentation model comprises the following steps: beginning with a multimodal body part dataset; pre-processing the multimodal body part dataset; sending the pre-processed multimodal body part dataset to a training dataset module and an evaluation dataset module; sending training dataset to a machine learning model; evaluating performance of the machine learning model using evaluation dataset and providing at least two outcomes: sending feedback derived from the evaluation dataset into the machine learning model for further tuning based on the evaluation results indicating suboptimal performance, or resulting in a fine-tuned machine learning model based on the evaluation results meeting predefined performance criteria; feeding pre-processed RGB or NIR images into the fine-tuned machine learning model; producing a second output, wherein the second output comprises extracted feature corresponding to body parts; sending the extracted body part features and pre-processed long-wave infrared (LWIR) image data to a masking operation; masking the LWIR image data using the body part features to generate a third output, comprising masked LWIR images representing thermal views of the corresponding body parts; sending the third output to a fine-tuned model section of the pressure injury assessment model for further analysis; and sending the third output to a feature segmentation section of the pressure injury assessment model; and (3) wherein the pressure injuries assessment model comprises the following steps: beginning with a thermal (LWIR) dataset on pressure injury; pre-processing thermal (LWIR) dataset pressure injury data, creating an evaluation dataset and a training dataset; sending the training dataset to a deep learning model; evaluating performance of the deep learning model using the evaluation dataset and providing at least two outcomes; sending feedback derived from the evaluation dataset into the machine learning model for further tuning based on the evaluation results indicating suboptimal performance, or resulting in a fine-tuned machine learning model based on the evaluation results meeting predefined performance criteria; sending the third output to the fine-tuned model section of the pressure injury assessment model and generating a fourth output; sending the fourth output to a decision engine; monitoring temperature of segments using data from the feature segmentation section; extracting temperature of affected area and labeling temperature T1; extracting temperature of near unaffected skin in same zone as T1 and labeling T2; calculating the difference between T1 and T2 using $\Delta T = T1 - T2$; evaluating $\Delta T$: indicating bed pressure injury if $\Delta T < \dot{\iota}$ threshold temperature, or indicating infected wound or subdermal infection if $\Delta T > \dot{\iota}$ threshold temperature; sending both indications to the decision engine; integrating the fourth output and the indications within the decision engine generating a fifth output; producing the fifth output wherein the fifth output comprises information regarding bed pressure injuries, infected wounds, and for each, the corresponding wound size and location; and sending the first output data and the fifth output data to a context generation module.

In an alternate embodiment, the monitoring apparatus for preventing pressure injuries comprises a plurality of hardware components, wherein the plurality of hardware components comprises: a thermal camera, a visible camera, integrated electronics, a privacy control section, and a cellular module or a wireless networking technology; a multimodal analysis system, wherein the multimodal analysis system comprises: a pose estimation model, a body part segmentation model, and a pressure injury assessment model; a multi-parameter input data section, wherein the multi-parameter input data section comprises user-added patient data relating to patient, environment, movement, wellness, historical data, and rotation-time; a risk assessment engine, wherein the risk assessment engine comprises a pressure injury risk calculator, an infected wound risk calculator, a mobility risk calculator, a patient specific risk calculator, and a confidence assessment; an intelligent decision matrix, wherein the intelligent decision matrix comprises a composite risk score, an urgency assessment, and a trend analysis; a decision support output; a data security and privacy management control section wherein the data security and privacy management control section comprises encryption, an access control, a data retention section, an audit trail, and a HIPPA compliant cloud; and a healthcare workflow integration, wherein the healthcare workflow integration comprises mobile alerts, EMR integration, a nurse dashboard, auto documentation, and compliance reports.

In another embodiment, the thermal camera further comprises a long-wave infrared sensor and the visible camera comprises a near-infrared camera.

In yet another embodiment, the thermal camera further comprises a long-wave infrared sensor and the visible camera comprises an RGB camera.

In one embodiment, the integrated housing comprises a lamp, a handheld module, or a clip-on module.

In an alternate embodiment, the decision support output comprises notification data relating to pressure injury, infected wound, posture change, or any other necessary alert required by user.

In an embodiment, the monitoring apparatus comprises a rule-based approach in addition to machine learning for the assessment of pressure injuries.

In one embodiment, the monitoring apparatus further comprises adaptive learning comprising a patient-specific baseline profile of posture and temperature distribution.

In another embodiment, the monitoring apparatus further comprises a fall detection module capable of being configured to identify unassisted patient bed exits or sudden posture changes.

In yet another embodiment, the monitoring apparatus further comprises a hygiene monitoring module capable of being configured to detect bed wetness or incontinence events.

In one embodiment, the monitoring apparatus further comprises a local edge-processing mode or a cloud-based AI processing mode.

In an alternate embodiment, the monitoring apparatus comprises automatic integration into an electronic medical record system comprising auto-log repositioning events and wound progression.

In yet another embodiment, the monitoring apparatus is capable of being configured to generate a composite patient risk index derived from tissue health, mobility, posture, hygiene, and patient clinical history.

In an alternate method, the machine learning model comprises a convolutional neural network (CNN), a recurrent neural network (RNN), a long short-term memory network (LSTM), a transformer model, an artificial neural network (ANN), or any other artificial intelligence model capable of performing posture estimation, body part segmentation, or pressure injury assessment.

Various objects, features, aspects, and advantages of the inventive subject matter will become apparent from the following detailed description of exemplary embodiments, along with the accompanying figures in which like numerals represent like components.

DETAILED DESCRIPTION OF THE INVENTION

Figure 1:
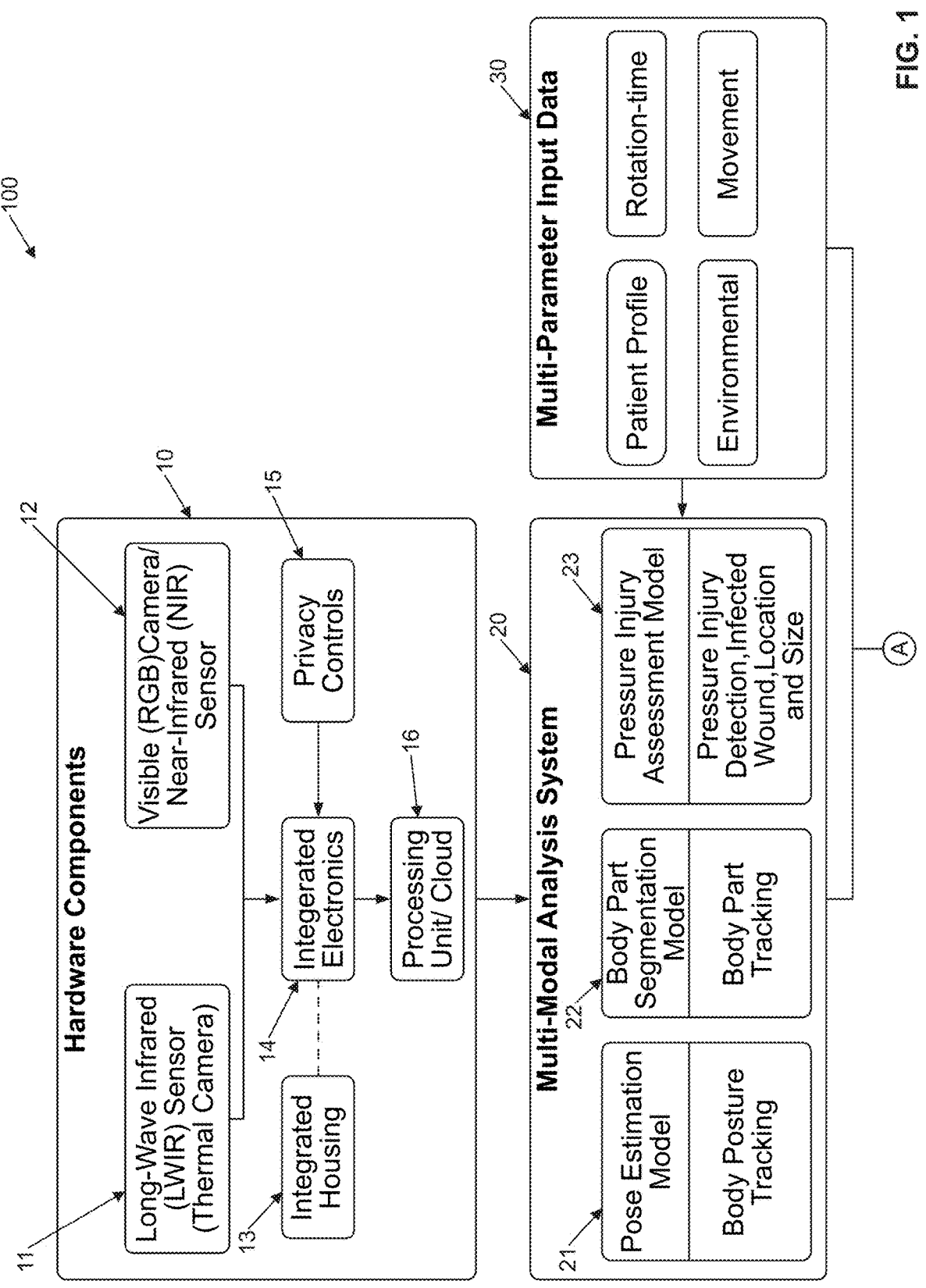
FIG. 1 depicts a block diagram of an exemplary embodiment of a monitoring apparatus for preventing pressure injuries.

The following description is not an admission that any of the information provided herein is prior art or relevant to the present invention, or that any publication specifically or implicitly referenced is prior art. Any publications cited in the description are incorporated by reference herein. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "into" and "on" unless the context clearly dictates otherwise.

As used herein, the term "about" in conjunction with a numeral refers to a range of that numeral starting from 10% below the absolute value of the numeral to 10% above the absolute value of the numeral, inclusive.

As used herein, the terms "monitoring apparatus for preventing pressure injuries" and "monitoring apparatus" are used interchangeably throughout this disclosure.

As used herein, the terms "multimodal pose estimation" and "MPS" are used interchangeably throughout this disclosure.

As used herein, the terms "red, green, blue" and "RGB" are used interchangeably throughout this disclosure. RGB cameras are designed to capture visible light.

As used herein, the terms "artificial intelligence" and "AI" are used interchangeably throughout this disclosure.

As used herein, the terms "electronic medical record" and "EMR" are used interchangeably throughout this disclosure.

As used herein, the terms, "Long-wave infrared" and "LWIR" are used interchangeably throughout this disclosure.

As used herein, the terms "Near-Infrared" and "NIR" are used interchangeably throughout this disclosure.

As used herein, the terms "multimodal body part" and "MBP" are used interchangeably throughout this disclosure.

As used herein, the terms "Convolutional Neural Network" and "CNN" are used interchangeably throughout this disclosure.

The present invention is directed to a monitoring apparatus and method for preventing pressure injuries. More specifically, an apparatus and method that is portable, multifunctional, and easy to use, capable of passive monitoring, AI triage monitoring, and EMR integration that can detect deep tissue injuries, falls, and/or bed wetness, using an equitable approach to detection.

The monitoring apparatus is capable of integrating clinical-grade monitoring into an intuitive, ambient device that is capable of blending into everyday environments. In addition, the monitoring apparatus is capable of continuously tracking a patient's posture and localized temperature distribution without any physical contact. In keeping a patient's dignity and comfort in mind, the monitoring apparatus does not require a caregiver to interact with the monitoring apparatus, thus, ensuing ease of use.

The present invention is capable of detecting pressure injuries before becoming visible on the skin. The monitoring apparatus comprises AI that processes thermal and NIR/visual data to identify subtle physiological signs of impaired blood flow (ischemia), wound infection, subdermal infection, or inflammation, which precede pressure injury formation, allowing caregivers to intervene early.

The monitoring apparatus is capable of sending simple application-based notifications to a caregiver or a family member when attention is needed, helping them respond promptly without constant supervision, empowering families without requiring clinical knowledge.

The monitoring apparatus for preventing pressure injuries is capable of flagging hygiene or incontinence issues, detecting patient falls, and posture change tracking to guide repositioning or mobility routines.

The monitoring apparatus is capable of providing continuous, contactless thermal and posture monitoring that detects early physiological changes (i.e., ischemia, infection, subdermal infection, inflammation) before visible symptoms appear.

The monitoring apparatus and method for preventing pressure injuries comprises an AI model that overlays posture detection and thermal data to automatically detect abnormal patterns, flag risk zones, and prioritize interventions, reducing human error and enabling early intervention with less labor. The AI model comprises three machine learning blocks: (a) pose estimation model, (b) body part segmentation model, and (c) pressure injury assessment model, wherein the pressure injury assessment model further comprises a machine learning model and a rule-based model. In addition, the rule-based model also analyzes the data, helping in areas with insufficient data for fine-tuning the model.

The monitoring apparatus and method for preventing pressure injuries comprises far-infrared thermal imaging to track temperature patterns and RGB or near infrared imaging to track body posture and segment body parts, wherein these inputs are processed in real time through a machine learning model trained to recognize ischemia, infection, inflammation, moisture risk, and inadequate repositioning of the patient.

The monitoring apparatus and method for preventing pressure injuries is capable of data logging and system support, wherein the system is capable of logging rotation events, risk alerts, and thermal anomalies supporting documentation for regulatory compliance. In addition, the monitoring apparatus comprises scalable architecture, supporting local edge processing, or cloud-based AI processing, thus, allowing for HIPPA-compliant data handling and integration with EMR's where required.

Exemplary configurations of the present invention are depicted in FIGS. 1-6, in which monitoring apparatus and method for preventing pressure injuries 100 is configured to detect pressure injuries in patients prior to an injury presenting on the skin.

FIG. 1 depicts a block diagram of an exemplary embodiment of monitoring apparatus for preventing pressure injuries 100, wherein monitoring apparatus 100 comprises plurality of hardware components 10, multimodal analysis system 20, multi-parameter input data section 30, risk assessment engine 40, intelligent decision matrix 50, decision support output 60, and data security and privacy management section 70.

In an embodiment, plurality of hardware components 10 comprises thermal camera 11, visible camera 12, integrated housing unit 13, integrated electronics 14, privacy control section 15, and processing unit 16; multimodal analysis system 20 comprises pose estimation model 21, body part segmentation model 22, and pressure injury assessment model 23; multi-parameter input data section 30 comprises user-added patient data relating to patient, environment, movement, and rotation-time; risk assessment engine 40 comprises pressure injury risk calculator 41, mobility risk calculator 42, and confidence assessment 43; intelligent decision matrix 50 comprises composite risk score 51, urgency assessment 52, and trend analysis 53; decision support output 60; and data security and privacy management control section 70 comprises access control 71, data retention section 72, and a HIPPA compliant cloud 73.

In one embodiment, decision support output 60 comprises notification data relating to pressure injury 61, posture change 62, or any other necessary alert 63. Notification data is based on the user's needs and patient data.

In an alternate embodiment, hardware components 10 comprises thermal camera 11 and near-infrared camera 12.

Figure 2:
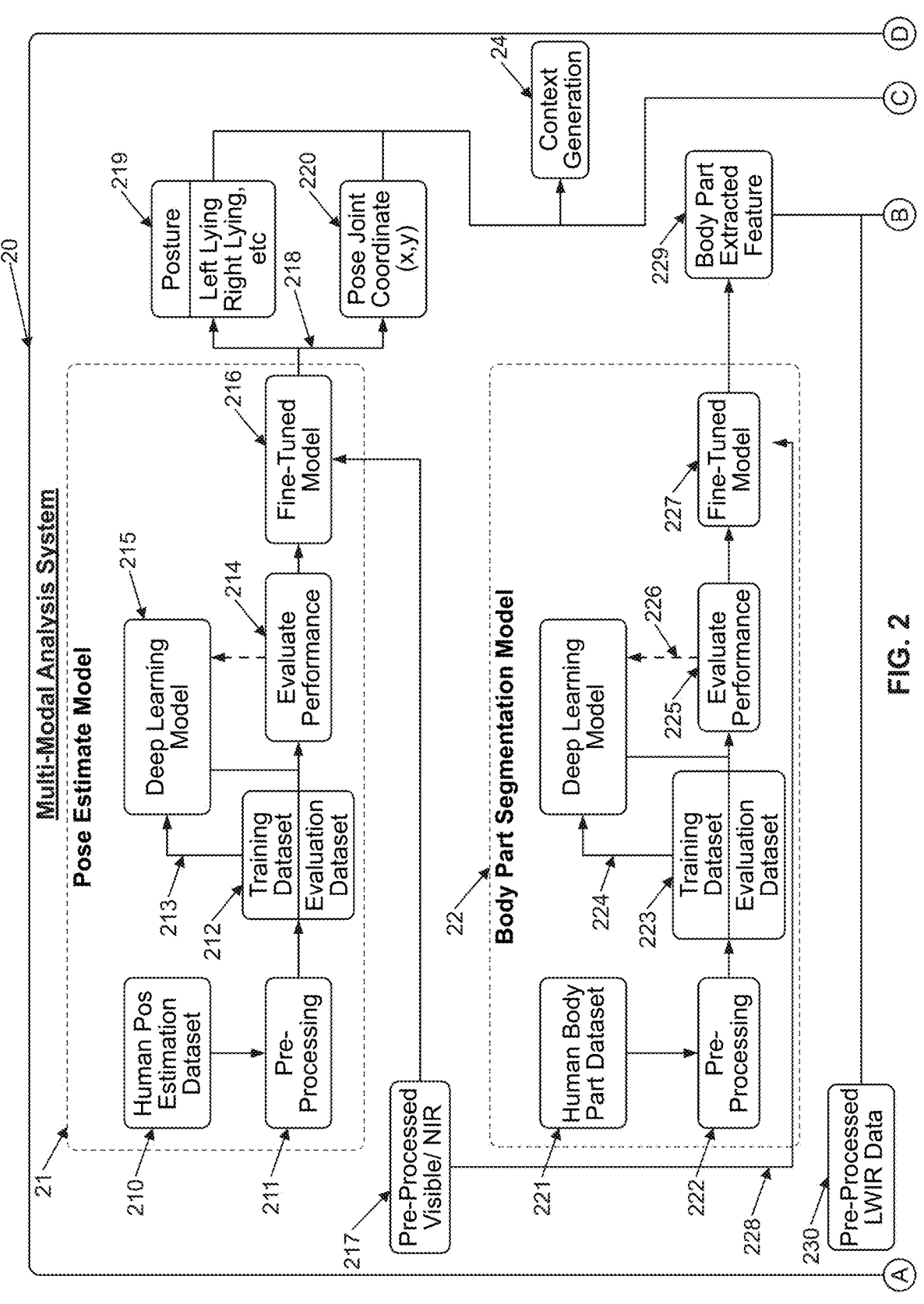
FIG. 2 depicts a flow chart of an exemplary method for preventing pressure injuries.
Figure 2:
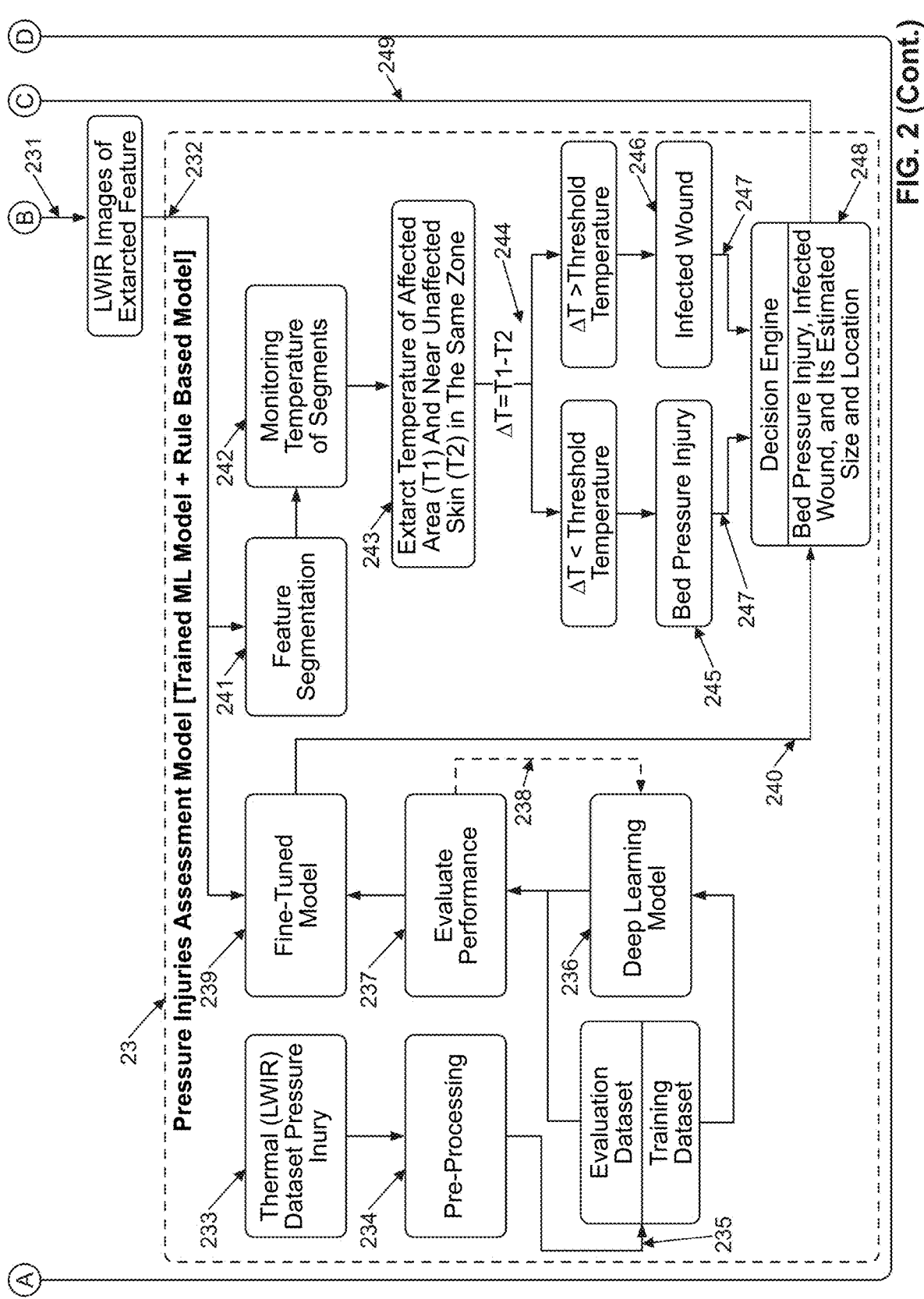

FIG. 2 depicts a flow chart of an exemplary method for monitoring a patient and preventing pressure injuries using multimodal analysis system 20, which comprises various steps in pose estimation model 21, body part segmentation model 22, and pressure injury assessment model 23.

In this embodiment, pose estimation model 21 comprises the following steps: beginning with a multimodal pose estimation (MPS) dataset 210, pre-processing of MPS dataset 211, dividing MPS into two subsets, a MPS training dataset and a MPS evaluation dataset 212, sending training dataset to train a machine learning model, creating trained model 213, using MPS evaluation dataset 212 to evaluate trained model 213 and providing at least two outcomes 214, if evaluation results indicate suboptimal performance, sending feedback derived from evaluation dataset 212 back into trained model 213 for further tuning 215; or if evaluation results meet predefined performance criteria, resulting in a fine-tuned machine learning model 216; sending an exemplary pre-processed visible or near-infrared (NIR) image 217 to the fine-tuned model 216, and producing first output 218, wherein first output 218 comprises posture information 219 and pose joint coordinates 220.

In the same embodiment, body part segmentation model 22 comprises the following steps: beginning with a multimodal body part (MBP) dataset 221; pre-processing MBP dataset 222; dividing MBP dataset into two subsets, a MBP training dataset and a MBP evaluation dataset 223; sending training dataset to train a machine learning model, creating a trained model 224; evaluating trained model 224 using MBP evaluation dataset 223 and providing evaluation results 225; if evaluation results 225 indicate suboptimal performance, sending feedback derived from MBP evaluation dataset 223 back through trained model 224 for further tuning 226, or if evaluation results meet predefined performance criteria, resulting in a fine-tuned machine learning model 227; sending an exemplary pre-processed visible/NIR image through fine-tuned model 228; producing second output 229, wherein second output 229 comprises body part extracted feature; sending body part extracted feature 229 and exemplary pre-processed LWIR data 230 to masking operation 231; generating third output 232, wherein third output 232 comprises masked LWIR images; sending third output 232 to fine-tuned model 239 section in pressure injury assessment model 23, or else to feature segmentation section 241 of pressure injury assessment model 23.

In this embodiment, masked LWIR images from third output 232 comprises thermal representations of the respective body parts.

In the same embodiment, pressure injury assessment model 23 comprises the following steps: beginning with a thermal (LWIR) dataset on pressure injury 233; pre-processing LWIR dataset pressure injury data 234; creating an evaluation dataset and a training dataset 235; sending training dataset through a deep learning model using CNN 236; evaluating performance of CNN model using evaluation dataset 237; if evaluation results indicate suboptimal performance, sending feedback derived from evaluation dataset 237 back into trained model for further tuning 238; or if evaluation results meet predefined performance criteria, resulting in a fine-tuned model 239; generating fourth output 240, wherein fourth output 240 comprises data on pressure injury and/or infected wound; sending fourth output 240 to decision engine 248; monitoring temperature of body part segments 242 using data from feature segmentation section 241; extracting temperature of affected area and labeling temperature T1 and extracting temperature of near unaffected skin in same zone as T1 and labeling T2 243; calculating the difference between T1 and T2 using $\Delta T = T1 - T2$ and evaluating $\Delta T$ 244, a $\Delta T$ less than the threshold temperature indicates a bed pressure injury 245; a $\Delta T$ greater than the threshold temperature indicates an infected wound 246; sending indications 247 to decision engine 248; integrating results from fine-tunned model 239 and indications 247 resulting in fifth output 249 to user; and sending first output data 218 and fifth output data 249 to context generation module 24.

In an alternate embodiment, threshold temperature is set by a user based on machine learning model, location of the wound, and patient conditions.

In one embodiment, fourth output 240 comprises data regarding whether the patient has a bed pressure injury or an infected wound, or a combination of the two, and for each the corresponding size and location. One of ordinary skill in the art can envision other output data points for fourth output 240 that are within the scope of the present invention.

Figure 3:
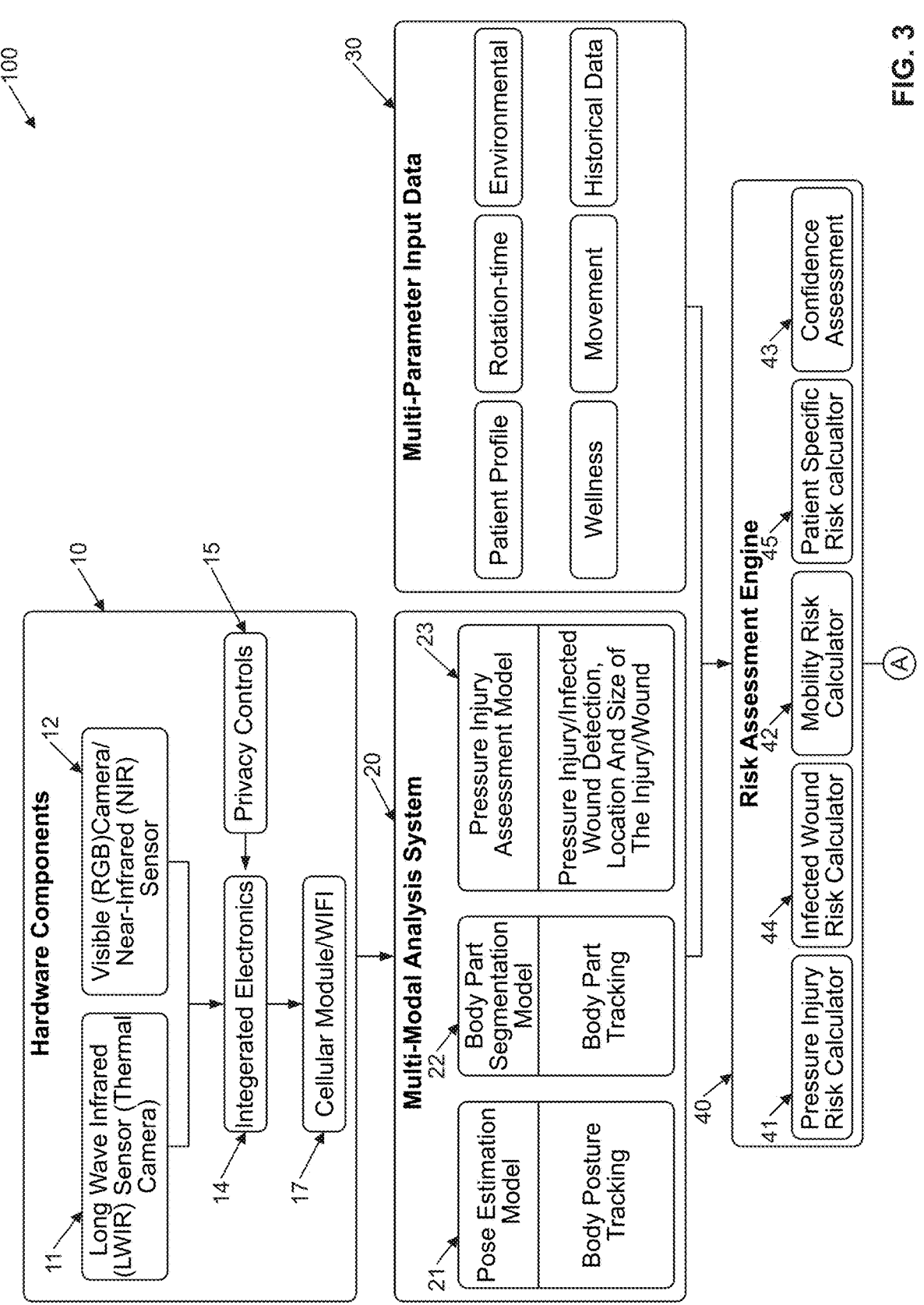
FIG. 3 depicts a block diagram of an alternate embodiment of a monitoring apparatus for preventing pressure injuries.
Figure 3:
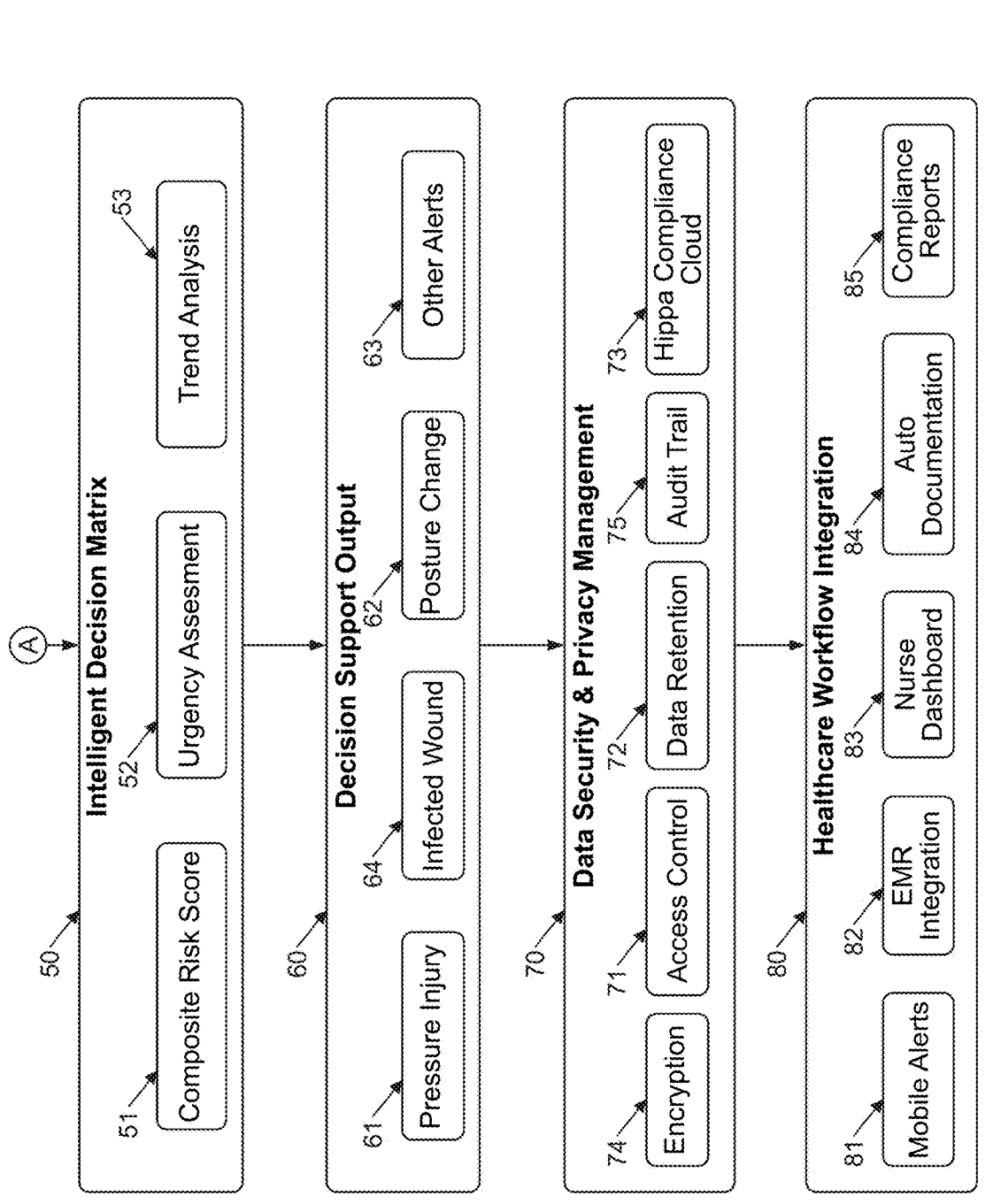

FIG. 3 depicts a block diagram of an alternate embodiment of a monitoring apparatus for preventing pressure injuries, wherein monitoring apparatus 100 comprises plurality of hardware components 10, multimodal analysis system 20, multi-parameter input data section 30, risk assessment engine 40, intelligent decision matrix 50, decision support output 60, data security and privacy management section 70, and healthcare workflow integration 80.

In an alternate embodiment, plurality of hardware components 10 comprises thermal camera 11, visible camera 12, integrated electronics 14, privacy control section 15, and a cellular module or wireless networking technology 17; multimodal analysis system 20 comprises pose estimation model 21, body part segmentation model 22, and pressure assessment model 23; multi-parameter input data section 30 comprises user-added patient data relating to patient, environment, movement, wellness, historical data, and rotation-time; risk assessment engine 40 comprises pressure injury risk calculator 41, mobility risk calculator 42, confidence assessment 43, infected wound risk calculator 44, and patient specific risk calculator 45; intelligent decision matrix 50 comprises composite risk score 51, urgency assessment 52, and trend analysis 53; decision support output 60 comprises notification data relating to pressure injury 61, posture change 62, infected wound 64, or any other necessary alert 63; data security and privacy management control section 70 comprises access control 71, data retention section 72, a HIPPA compliant cloud 73, encryption 74, and audit trail 75; and healthcare workflow integration 80 comprises mobile alerts 81, EMR integration 82, nurse dashboard 83, auto documentation 84, and compliance reports 85.

In one embodiment, notification data related to decision support output 60 is based on the user's needs and patient data.

In one embodiment, multimodal data 121 is uploaded to the cloud using cellular module, wherein cloud-based AI processing analyzes multimodal data.

In one embodiment, multimodal data 121 is uploaded to the cloud using cellular, wherein cloud-based AI processing analyzes multimodal data.

In another embodiment, multimodal data 121 is analyzed using hardware-based AI processing.

In yet another embodiment, multimodal analysis system 20 comprises a rule-based approach in addition to deep learning for the assessment of pressure injuries.

Figure 4:
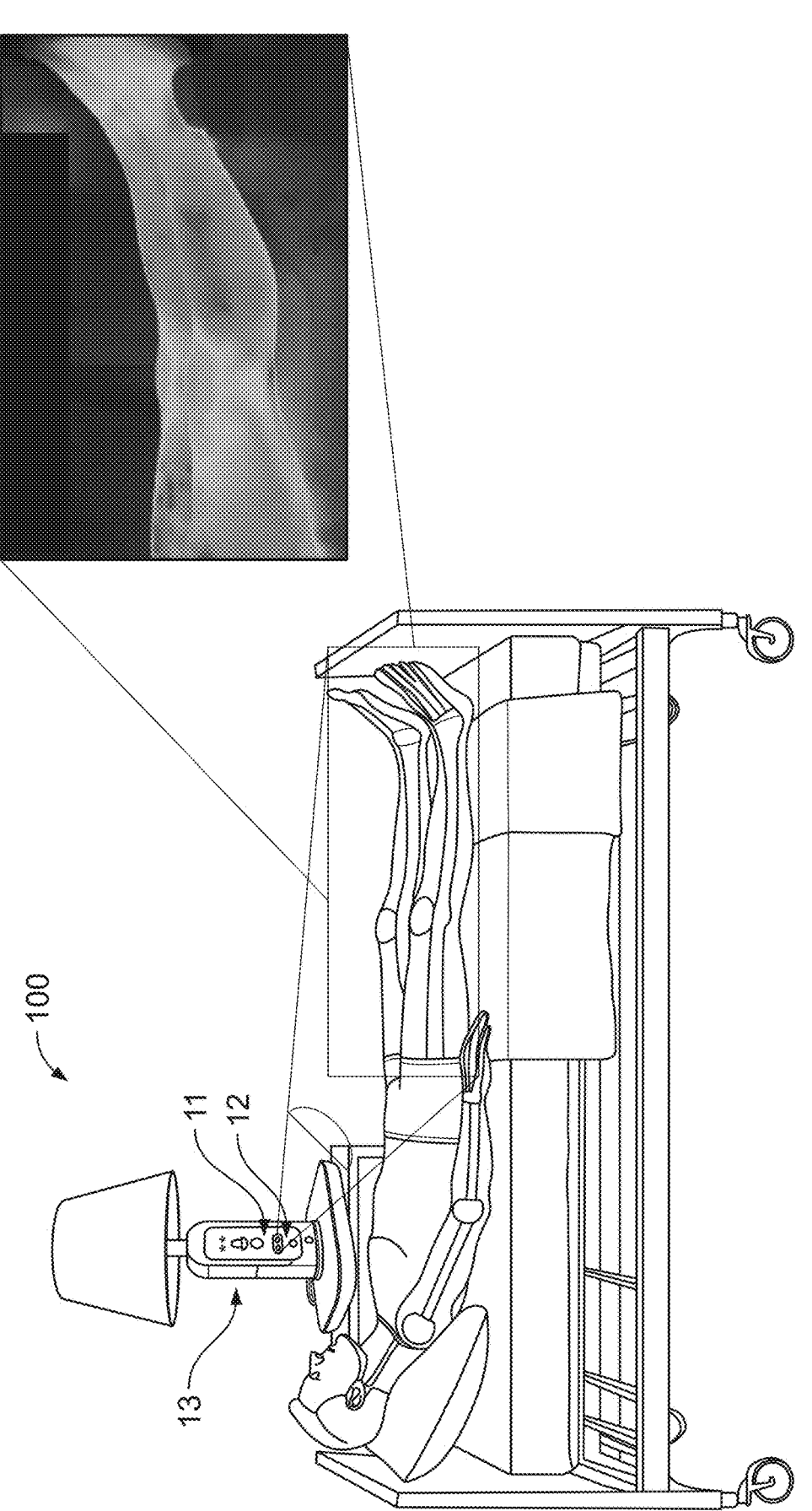
FIG. 4 depicts a perspective view of an exemplary embodiment of a monitoring apparatus for preventing pressure injuries in use on a patient.

FIG. 4 depicts a perspective view of an exemplary embodiment of monitoring apparatus for preventing pressure injuries 100 in use on a patient. In this embodiment, integrated housing 13 comprises a lamp, wherein thermal camera 11 and visible camera 12 actively monitor a patient in bed. In this embodiment, multimodal analysis system 20 analyzes the temperature differences of affected skin and unaffected skin on the patient's legs.

Figures 5A, 5B:
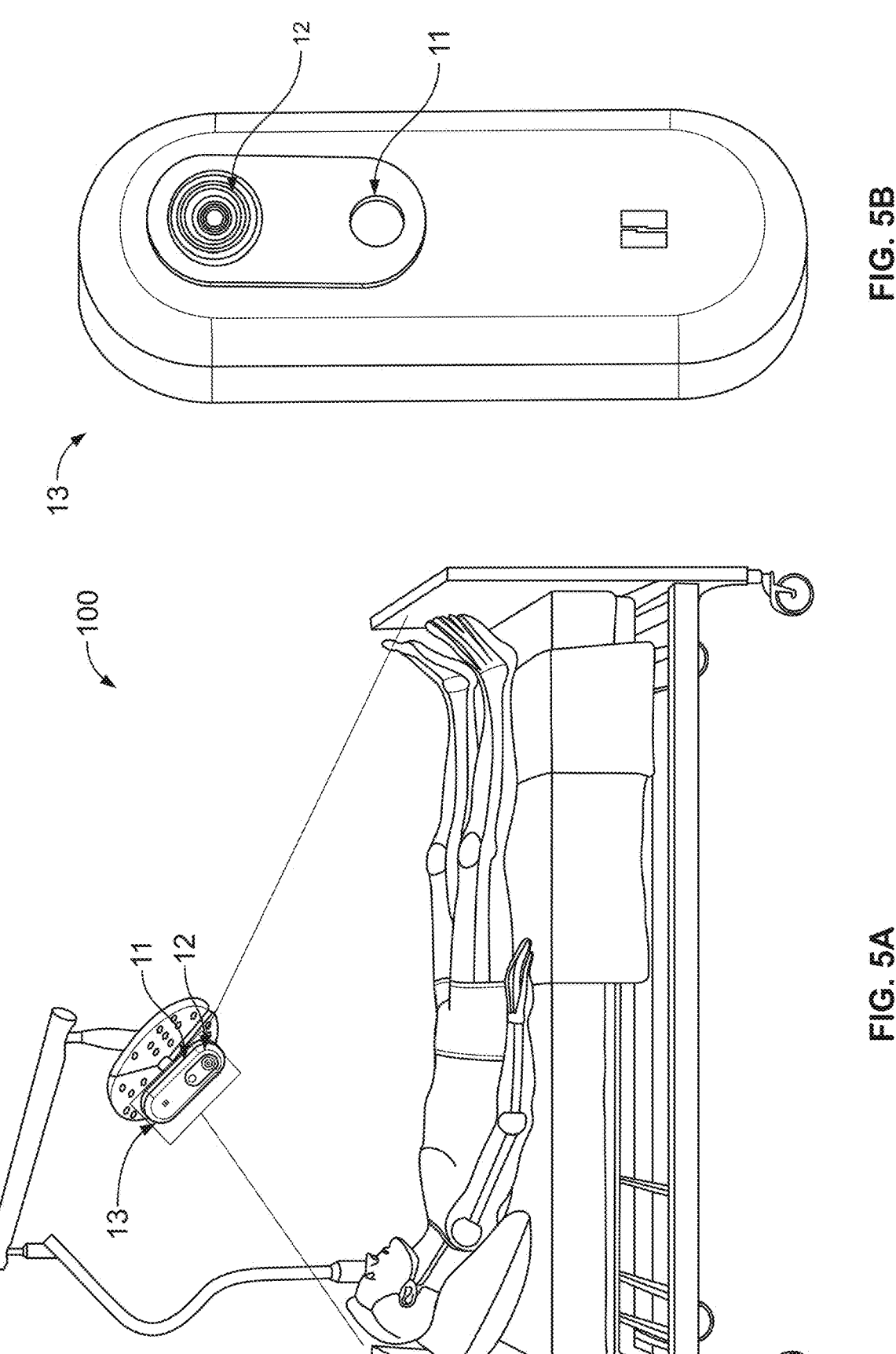
FIG. 5A depicts a perspective view of an alternate embodiment of a monitoring apparatus for preventing pressure injuries in use on a patient.
FIG. 5B depicts a front view of an alternate embodiment of a monitoring apparatus for preventing pressure injuries

FIG. 5A depicts a perspective view of an alternate embodiment of monitoring apparatus for preventing pressure injuries 100 in use on a patient, wherein integrated housing 13 comprises a unit capable of being mounted on a wall or ceiling, typical in a hospital setting. In this embodiment, thermal camera 11 and visible camera 12 actively monitor a patient from above their bed. In this embodiment, multimodal data is uploaded to the cloud, wherein cloud-based AI processing analyzes multimedia data.

In yet another embodiment, integrated housing 13 comprises a lamp, a handheld module, a clip-on module, or a mobile-cart unit.

FIG. 5B depicts a front view of an alternate embodiment of monitoring apparatus for preventing pressure injuries

100, wherein monitoring apparatus comprises thermal camera 11 and visible camera 12.

Figure 6:
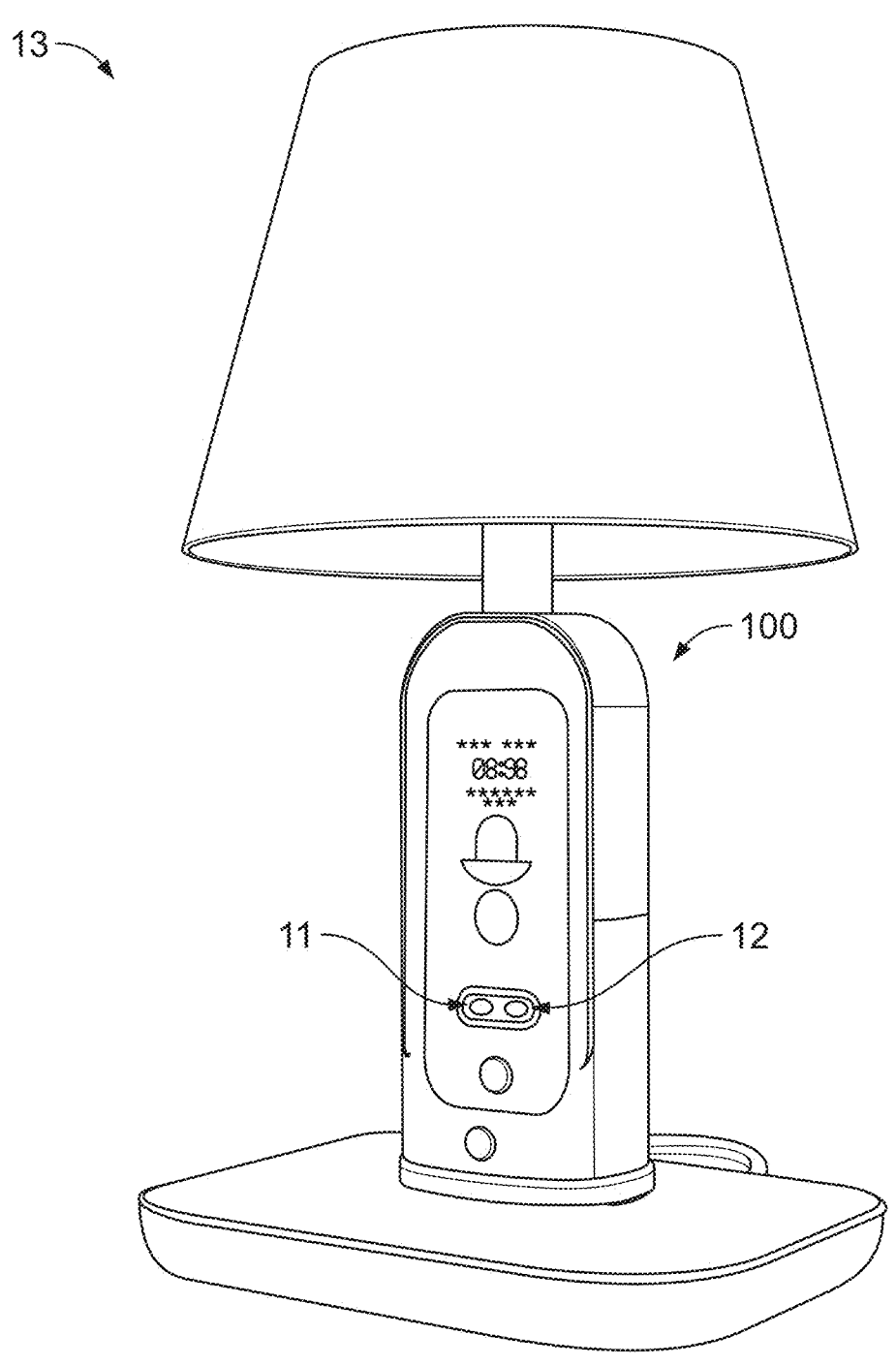
FIG. 6 depicts a perspective view of an exemplary embodiment of a monitoring apparatus for preventing pressure injuries wherein the integrated housing is a lamp.

FIG. 6 depicts a perspective view of an exemplary embodiment of monitoring apparatus for preventing pressure injuries 100 wherein integrated housing 13 is a discreet lamp. In this embodiment, integrated housing 13 comprises thermal camera 11 and visible camera 12.

In one embodiment, monitoring apparatus 100 further comprises adaptive learning comprising a patient-specific baseline profile of posture and temperature distribution.

In another embodiment, monitoring apparatus 100 further comprises a fall detection module capable of being configured to identify unassisted patient bed exits or sudden posture changes.

In yet another embodiment, monitoring apparatus 100 further comprises a hygiene monitoring module capable of being configured to detect bed wetness or incontinence events.

In one embodiment, monitoring apparatus 100 further comprises a local edge-processing mode or a cloud-based AI processing mode.

In an alternate embodiment, monitoring apparatus 100 comprises automatic integration into an electronic medical record system comprising auto-log repositioning events and wound progression.

In yet another embodiment, monitoring apparatus 100 is capable of being configured to generate a composite patient risk index derived from tissue health, mobility, posture, hygiene, and patient clinical history.

In an alternate method, machine learning model comprises a convolutional neural network (CNN), a recurrent neural network (RNN), a long short-term memory network (LSTM), a transformer model, an artificial neural network (ANN), or any other artificial intelligence model capable of performing posture estimation, body part segmentation, or pressure injury assessment.

Thus, specific embodiments of monitoring apparatus and method for preventing pressure injuries 100 have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A monitoring apparatus for preventing pressure injuries comprising:
    a. a plurality of hardware components, wherein said plurality of hardware components comprises:
        i. a thermal camera,
        ii. a visible camera,
        iii. an integrated housing unit,
        iv. integrated electronics,
        v. a privacy control section, and
        vi. a processing unit;

b. a multimodal analysis system, wherein said multimodal analysis system comprises:

i. a pose estimation model, ii. a body part segmentation model, and iii. a pressure injury assessment model;

c. a multi-parameter input data section, wherein said multi-parameter input data section comprises user-added patient data relating to patient, environment, movement, and rotation-time;

d. a risk assessment engine, wherein said risk assessment engine comprises a pressure injury risk calculator, a mobility risk calculator, and a confidence assessment;

e. an intelligent decision matrix, wherein said intelligent decision matrix comprises a composite risk score, an urgency assessment, and a trend analysis;

f. a decision support output; and g. a data security and privacy management control section wherein said data security and privacy management control section comprises an access control, a data retention section, and a HIPPA compliant cloud.

2. The monitoring apparatus for preventing pressure injuries as recited in claim 1, wherein said thermal camera further comprises a long-wave infrared sensor and said visible camera comprises a near-infrared camera.

3. The monitoring apparatus for preventing pressure injuries as recited in claim 1, wherein said thermal camera further comprises a long-wave infrared sensor and said visible camera comprises an RGB camera.

4. The monitoring apparatus for preventing pressure injuries as recited in claim 1, wherein said integrated housing comprises a lamp, a handheld module, or a clip-on module.

5. The monitoring apparatus for preventing pressure injuries as recited in claim 1, wherein said decision support output comprises notification data relating to pressure injury, posture change, or any other necessary alert required by user.

6. A method for monitoring a patient using said multimodal analysis system as recited in claim 1, a. wherein said pose estimation model comprises the following steps:

i. beginning with a multimodal pose estimation dataset;

ii. pre-processing said multimodal pose estimation dataset;

iii. sending processed said multimodal pose estimation dataset to a training dataset module and to an evaluation dataset module;

iv. sending training dataset to a machine learning model;

v. evaluating performance of said machine learning model using said evaluation dataset and providing at least two outcomes:

1. sending feedback derived from said evaluation dataset into said machine learning model for further tuning based on evaluation results indicating suboptimal performance, or 2. resulting in a fine-tuned machine learning model based on said evaluation results meeting predefined performance criteria;

vi. feeding pre-processed RGB or NIR images into said fine-tuned machine learning model;

vii. producing a first output, wherein said first output comprises posture information and pose joint coordinates; and b. wherein said body part segmentation model comprises the following steps:

i. beginning with a multimodal body part dataset;

ii. pre-processing said multimodal body part dataset;

iii. sending said pre-processed multimodal body part dataset to a training dataset module and an evaluation dataset module;

iv. sending training dataset to a machine learning model;

v. evaluating performance of said machine learning model using evaluation dataset and providing at least two outcomes:

1. sending feedback derived from said evaluation dataset into said machine learning model for further tuning based on said evaluation results indicating suboptimal performance, or 2. resulting in a fine-tuned machine learning model based on said evaluation results meeting predefined performance criteria;

vi. feeding pre-processed RGB or NIR images into said fine-tuned machine learning model;

vii. producing a second output, wherein said second output comprises extracted feature corresponding to body parts;

viii. sending said extracted body part features and pre-processed long-wave infrared (LWIR) image data to a masking operation;

ix. masking said LWIR image data using said body part features to generate a third output, wherein said third output comprises masked LWIR images representing thermal views of said corresponding body parts;

x. sending said third output to a fine-tuned model section of said pressure injury assessment model for further analysis; and xi. sending said third output to a feature segmentation section of said pressure injury assessment model; and c. wherein said pressure injury assessment model comprises the following steps:

i. beginning with a thermal (LWIR) dataset on pressure injury;

ii. pre-processing thermal (LWIR) dataset pressure injury data, creating an evaluation dataset and a training dataset;

iii. sending said training dataset to a deep learning model;

iv. evaluating performance of said deep learning model using said evaluation dataset and providing at least two outcomes;

1. sending feedback derived from said evaluation dataset into said machine learning model for further tuning based on said evaluation results indicating suboptimal performance, or 2. resulting in a fine-tuned machine learning model based on said evaluation results meeting predefined performance criteria;

v. sending said third output to a said fine-tuned model section of said pressure injury assessment model and generating a fourth output;

vi. sending said fourth output to a decision engine;

vii. monitoring temperature of segments using data from said feature segmentation section;

viii. extracting temperature of affected area and labeling temperature T1;

ix. extracting temperature of near unaffected skin in same zone as T1 and labeling T2;

x. calculating the difference between T1 and T2 using $\Delta T = T1 - T2$;

xi. evaluating $\Delta T$:

1. indicating bed pressure injury if $\Delta T <$ threshold temperature, or 2. indicating infected wound or subdermal infection if ΔT>threshold temperature;

xii. sending both indications to said decision engine;

xiii. integrating said fourth output and said indications within said decision engine generating a fifth output;

xiv. producing said fifth output wherein said fifth output comprises information regarding bed pressure injuries, infected wounds, and for each, the corresponding wound size and location; and d. sending said first output data and said fifth output data to a context generation module.

7. A monitoring apparatus for preventing pressure injuries comprising:

a. a plurality of hardware components, wherein said plurality of hardware components comprises:

i. a thermal camera, ii. a visible camera, iii. integrated electronics, iv. a privacy control section, and v. a cellular module or a wireless networking technology;

b. a multimodal analysis system, wherein said multimodal analysis system comprises:

i. a pose estimation model, ii. a body part segmentation model, and iii. a pressure injury assessment model;

c. a multi-parameter input data section, wherein said multi-parameter input data section comprises user-added patient data relating to patient, environment, movement, wellness, historical data, and rotation-time;

d. a risk assessment engine, wherein said risk assessment engine comprises a pressure injury risk calculator, an infected wound risk calculator, a mobility risk calculator, a patient specific risk calculator, and a confidence assessment;

e. an intelligent decision matrix, wherein said intelligent decision matrix comprises a composite risk score, an urgency assessment, and a trend analysis;

f. a decision support output;

g. a data security and privacy management control section wherein said data security and privacy management control section comprises encryption, an access control, a data retention section, an audit trail, and a HIPPA compliant cloud; and h. a healthcare workflow integration, wherein said healthcare workflow integration comprises mobile alerts, EMR integration, a nurse dashboard, auto documentation, and compliance reports.

8. The monitoring apparatus for preventing pressure injuries as recited in claim 7, wherein said thermal camera further comprises a long-wave infrared sensor and said visible camera comprises a near-infrared camera.

9. The monitoring apparatus for preventing pressure injuries as recited in claim 7, wherein said thermal camera further comprises a long-wave infrared sensor and said visible camera comprises an RGB camera.

10. The monitoring apparatus for preventing pressure injuries as recited in claim 7, wherein said integrated housing comprises a lamp, a handheld module, a clip-on module, a wall-mounted unit, a ceiling-mounted unit, or a mobile-cart unit.

11. The monitoring apparatus for preventing pressure injuries as recited in claim 7, wherein said decision support output comprises notification data relating to pressure injury, infected wound, posture change, or any other necessary alert required by user.

12. A method for monitoring a patient using said multimodal analysis system as recited in claim 7, a. wherein said pose estimation model comprises the following steps:

i. beginning with a multimodal pose estimation dataset;

ii. pre-processing said multimodal pose estimation dataset;

iii. sending processed said multimodal pose estimation dataset to a training dataset module and to an evaluation dataset module;

iv. sending training dataset to a machine learning model;

v. evaluating performance of said machine learning model using said evaluation dataset and providing at least two outcomes:

1. sending feedback derived from said evaluation dataset into said machine learning model for further tuning based on evaluation results indicating suboptimal performance, or 2. resulting in a fine-tuned machine learning model based on said evaluation results meeting predefined performance criteria;

vi. feeding pre-processed RGB or NIR images into said fine-tuned machine learning model;

vii. producing a first output, wherein said first output comprises posture information and pose joint coordinates; and b. wherein said body part segmentation model comprises the following steps:

i. beginning with a multimodal body part dataset;

ii. pre-processing said multimodal body part dataset;

iii. sending said pre-processed multimodal body part dataset to a training dataset module and an evaluation dataset module;

iv. sending training dataset to a machine learning model;

v. evaluating performance of said machine learning model using evaluation dataset and providing at least two outcomes:

1. sending feedback derived from said evaluation dataset into said machine learning model for further tuning based on said evaluation results indicating suboptimal performance, or 2. resulting in a fine-tuned machine learning model based on said evaluation results meeting predefined performance criteria;

vi. feeding pre-processed RGB or NIR images into said fine-tuned machine learning model;

vii. producing a second output, wherein said second output comprises extracted feature corresponding to body parts;

viii. sending said extracted body part features and pre-processed long-wave infrared (LWIR) image data to a masking operation;

ix. masking said LWIR image data using said body part features to generate a third output, wherein said third output comprises masked LWIR images representing thermal views of said corresponding body parts;

x. sending said third output to a fine-tuned model section of said pressure injury assessment model for further analysis; and xi. sending said third output to a feature segmentation section of said pressure injury assessment model; and c. wherein said pressure injury assessment model comprises the following steps:

i. beginning with a thermal (LWIR) dataset on pressure injury;

ii. pre-processing thermal (LWIR) dataset pressure injury data, creating an evaluation dataset and a training dataset;

iii. sending said training dataset to a deep learning model;

iv. evaluating performance of said deep learning model using said evaluation dataset and providing at least two outcomes;

1. sending feedback derived from said evaluation dataset into said machine learning model for further tuning based on said evaluation results indicating suboptimal performance, or 2. resulting in a fine-tuned machine learning model based on said evaluation results meeting predefined performance criteria;

v. sending said third output to a said fine-tuned model section of said pressure injury assessment model and generating a fourth output;

vi. sending said fourth output to a decision engine;

vii. monitoring temperature of segments using data from said feature segmentation section;

viii. extracting temperature of affected area and labeling temperature T1;

ix. extracting temperature of near unaffected skin in same zone as T1 and labeling T2;

x. calculating the difference between T1 and T2 using $\Delta T = T1 - T2$;

xi. evaluating $\Delta T$:

1. indicating bed pressure injury if $\Delta T <$ threshold temperature, or 2. indicating infected wound or subdermal infection if $\Delta T >$ threshold temperature;

xii. sending both indications to said decision engine;

xiii. integrating said fourth output and said indications within said decision engine generating a fifth output;

xiv. producing said fifth output wherein said fifth output comprises information regarding bed pressure injuries, infected wounds, and for each, the corresponding wound size and location; and d. sending said first output data and said fifth output data to a context generation module.

13. The method for using monitoring apparatus for preventing pressure injuries as recited in claim 12, wherein said monitoring apparatus comprises a rule-based approach in addition to machine learning for the assessment of pressure injuries.

14. The monitoring apparatus for preventing pressure injuries as recited in claim 7, wherein said monitoring apparatus further comprises adaptive learning comprising a patient-specific baseline profile of posture and temperature distribution.

15. The monitoring apparatus for preventing pressure injuries as recited in claim 7, wherein said monitoring apparatus further comprises a fall detection module capable of being configured to identify unassisted patient bed exits or sudden posture changes.

16. The monitoring apparatus for preventing pressure injuries as recited in claim 7, wherein said monitoring apparatus further comprises a hygiene monitoring module capable of being configured to detect bed wetness or incontinence events.

17. The monitoring apparatus for preventing pressure injuries as recited in claim 7, wherein said monitoring apparatus further comprises a local edge-processing mode or a cloud-based AI processing mode.

18. The monitoring apparatus for preventing pressure injuries as recited in claim 7, wherein said monitoring apparatus comprises automatic integration into an electronic medical record system comprising auto-log repositioning events and wound progression.

19. The monitoring apparatus for preventing pressure injuries as recited in claim 7, wherein said monitoring apparatus is capable of being configured to generate a composite patient risk index derived from tissue health, mobility, posture, hygiene, and patient clinical history.

20. The method for monitoring a patient as recited in claim 12, wherein said machine learning model comprises a convolutional neural network (CNN), a recurrent neural network (RNN), a long short-term memory network (LSTM), a transformer model, an artificial neural network (ANN), or any other artificial intelligence model capable of performing posture estimation, body part segmentation, or pressure injury assessment.

\* \* \* \* \*